United States Patent [19]
Defrancq

[11] Patent Number: 6,062,321
[45] Date of Patent: May 16, 2000

[54] LIFTING DEVICE, PARTICULARLY A FRONT LIFT FOR AN AGRICULTURAL TRACTOR OR THE LIKE

[76] Inventor: Hubert Defrancq, 2, rue de Laon, F-02190 Guignicourt, France

[21] Appl. No.: 09/176,916

[22] Filed: Oct. 22, 1998

[30] Foreign Application Priority Data

Oct. 22, 1997 [FR] France .................................. 97 13218

[51] Int. Cl.⁷ ............................ A01B 59/043; B60D 1/00
[52] U.S. Cl. .......................................... 172/448; 172/680
[58] Field of Search ..................................... 172/439, 448, 172/677, 679, 680, 683

[56] References Cited

U.S. PATENT DOCUMENTS

| | | |
|---|---|---|
| 2,734,438 | 2/1956 | Todd . |
| 3,065,977 | 11/1962 | Virtue et al. . |
| 4,062,560 | 12/1977 | Mueller, Jr. et al. . |
| 4,216,975 | 8/1980 | Schafer ................................... 172/439 |
| 4,221,399 | 9/1980 | Berg ..................................... 172/439 X |
| 4,393,942 | 7/1983 | Mijot et al. .......................... 172/445 X |
| 5,542,477 | 8/1996 | Defrancq ................................. 172/439 |

FOREIGN PATENT DOCUMENTS 25 06 745  8/1976  Germany .
2 289 834  12/1995  United Kingdom .

*Primary Examiner*—Christopher J. Novosad
*Attorney, Agent, or Firm*—Young & Thompson

[57] ABSTRACT

A lifting device comprising: a backframe (1) equipped at its bottom with a pair of arms (4); lifting element (R) between the pair of arms (4) and the backframe (1), and two forearms (10a) mounted on each side of the pair of arms (4) on an articulation spindle (11), each forearm comprising an attachment bracket (13) and, at the opposite end, an extension (15) beyond the articulation spindle (11). The end of the extension (15) has a recess (16) which is open in the direction away from the attachment bracket. A stop connected to the pair of arms comprises a transverse spindle (20) equipped, over part of its length and of its periphery, with a radial bulge (E). When the bulge (E) is housed in the recess (16), the forearm (10a) is immobilized relative to the pair of arms (4), whereas when the bulge is out of the recess (16), a limited angular excursion of the forearm (10a) relative to the pair of arms (4) is possible.

20 Claims, 3 Drawing Sheets

LIFTING DEVICE, PARTICULARLY A FRONT LIFT FOR AN AGRICULTURAL TRACTOR OR THE LIKE

BACKGROUND OF THE INVENTION

The present invention relates to a lifting device, particularly a front lift for an agricultural tractor, allowing an implement to be hitched up at two lateral bottom points and a central top point.

The lifting devices to which the invention relates are of the kind which comprise:

a backframe intended to be fixed to the chassis of the tractor and equipped at its bottom with a pair of arms which is articulated to the backframe;

lifting means provided between the pair of arms and the backframe;

and two forearms, one mounted on each side of the pair of arms on an articulation spindle borne by this pair of arms, each forearm comprising an attachment bracket at an end distant from the pair of arms and, at the opposite end to the attachment bracket, an extension beyond the articulation spindle, this extension coming to bear, in the working position, against a stop connected to the pair of arms, it being possible for the forearm to be folded relative to the pair of arms when the device is not in use.

DESCRIPTION OF THE PRIOR ART

A device of this kind is known from French Patent 2,688,378 in the name of the same applicant.

Elsewhere, document EP-A-0,182,091 discloses a lifting device of a similar kind, in which the lifting means are provided directly between the backframe and the forearm. The rear extension of this forearm comes to bear against a stop which consists of a transverse bar or spindle engaged in a housing in the pair of arms.

A multi-function lifting device, particularly a front lift, must be capable of meeting the following requirements:

providing a locked working position, in which the two forearms are immobilized relative to the pair of arms;

providing a floating working position, in which the two forearms can move vertically and independently with a limited travel, to allow the implement to be laterally independent of the tractor;

providing a folded position for reducing the front overhang when the front lift is not in use and possibly to allow a fore-end weights carrier to be fitted without interference.

Various solutions for meeting these requirements have already been proposed.

Some, such as the solution in FR 2,688,378, are entirely satisfactory but incur manufacturing costs which ought to be reduced insofar as the anticipated use of the lifting device does not require such good performance as is provided by this solution.

Other solutions require numerous holes in the lower pair of arms and in the forearms, which increases the need for alignment during manufacture and weakens the parts for a given size. This leads to limited reliability and an increase in manufacturing costs.

It is also often difficult, in the case of a front lift device, to produce something strong which keeps the central part fairly clear for the passage of the front power takeoff, while remaining inside a limited width in order to maintain the turning angle of the front wheels of the tractor.

SUMMARY OF THE INVENTION

The object of the invention is, above all, to provide a lifting device which no longer has, or which has to a lesser extent, the drawbacks recalled hereinabove, and which allows the stated functions to be fulfilled with a minimum number of holes in the forearm and in the pair of arms, and for a lower cost of manufacture.

It is also desirable that this lifting device should be very easy to use.

According to the invention, a lifting device of the kind defined above is one wherein:

the end of the extension of the forearm away from the attachment bracket comprises a recess which is open in the direction away from the attachment bracket;

the stop connected to the pair of arms comprises a transverse spindle engaged in a housing in the pair of arms, the transverse spindle is equipped, over part of its length and of its periphery, with a radial bulge, the entity being such that when the bulge is housed in the recess, the edge of this recess is more or less in contact with the bulge and a region opposite of the spindle so that the forearm is immobilized relative to the pair of arms, whereas in an angular position in which the bulge is out of the recess, a limited angular excursion of the forearm relative to the pair of arms is possible, owing to the clearance between the spindle and the outline of the recess.

In general, the recess opens between two projections which are separated by a distance that exceeds the size of the bulge.

The recess has a noncircular shape with a long transverse dimension in the mean longitudinal direction of the forearm.

The bulge advantageously consists of at least one part attached, particularly by welding, to the transverse spindle which is formed of a cylindrical bar.

The attached part may consist of at least one length of round stock, generally of a smaller diameter than the bar, of axis parallel to that of the bar and placed tangentially against the bar.

Several lengths of round stock, particularly two, may be provided, tangential to each other.

The relative dimensions of the bulge, of the recess and of the space between the projections may be determined so that the bulge remains in the space between the projections when it has been placed there, despite any possible oscillation of the forearm relative to the pair of arms and a tendency of the transverse spindle to rotate about its geometric axis.

In an alternative, the pair of arms comprises, on each side towards the front, two cheeks delimiting between them a space for accommodating the rear part of a forearm, an articulation spindle passing through a hole made in this rear part, this spindle being supported by two holes made respectively in the cheeks, the outer cheek having an opening opening into a hole of the housing of the spindle, the opening being made up of a first cutout directed forward, and of a second cutout directed backward, each cutout being capable of accommodating the bulge in order to determine the positions in which the forearm is fixed and floating, respectively.

The transverse spindle is held, in the axial direction, in its housing in the pair of arms on the one side by the bulge coming into abutment against a wall of the pair of arms and, on the other side of the housing, by a retaining means such as a pin engaged in a diametral hole in the transverse spindle.

Advantageously, the forearm has on its upper edge a part capable of mating with a region of the transverse spindle, which forms a stop, when the forearm is placed in the folded position, so as to keep the forearm in this position.

This part may be provided in a part which is attached, particularly by welding, to the upper edge of the forearm. This attached part may consist of a small plate standing on edge.

That part of the forearm which mates with the transverse spindle may be concave and interact with a region of the cylindrical surface of the spindles.

BRIEF DESCRIPTION OF THE DRAWINGS

Apart from the provisions set out hereinabove, the invention consists in a certain number of other provisions which will be dealt with more fully later with regard to an exemplary embodiment described with reference to the appended drawings but which is not in any way limiting.

Finally.

DESCRIPTION OF THE PREFERRED EMBODIMENTS

Figure 1:
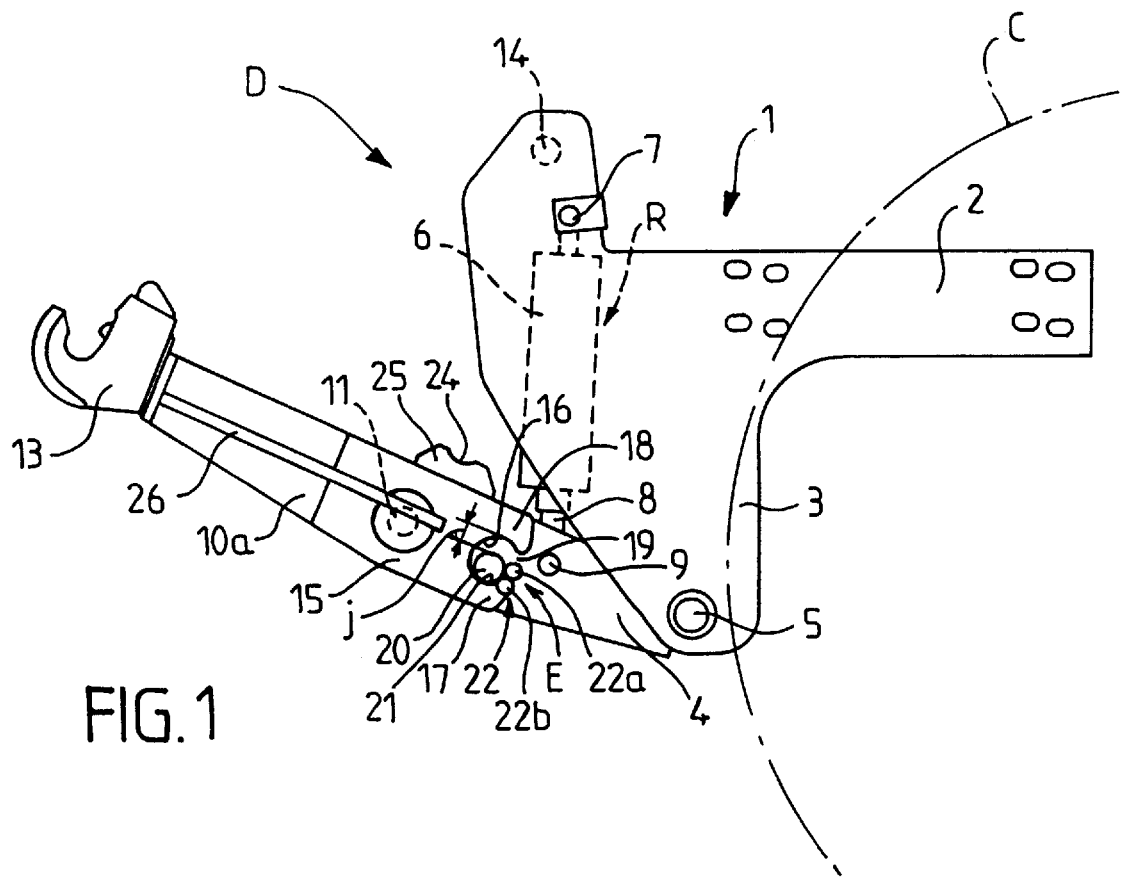
FIG. 1 of these drawings is a diagrammatic view in elevation of a front lift device in accordance with the invention, the forearm being in the working position.
Figure 2:
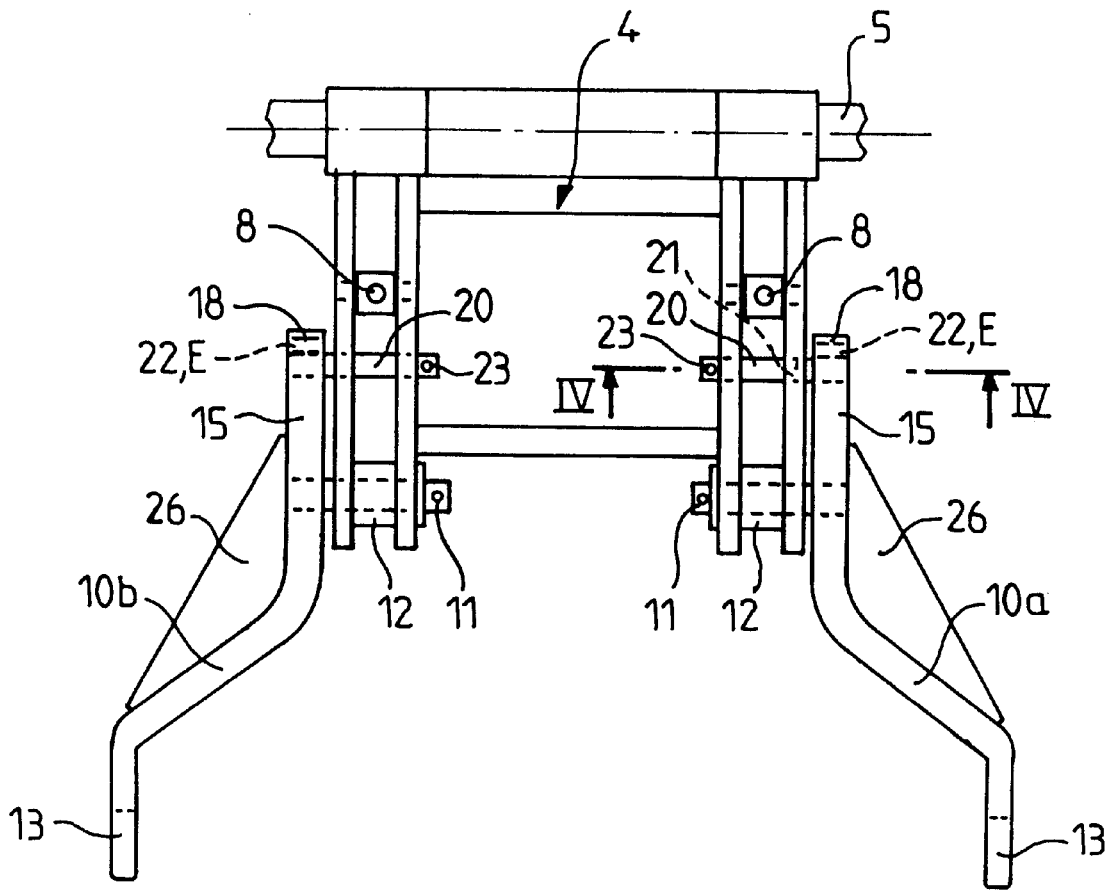
FIG. 2 is a diagrammatic plan view of the lifting device.

Referring to the drawings, particularly to FIGS. 1 and 2, it is possible to see a front lift device D for an agricultural tractor, the outline C of a front wheel of which is depicted diagrammatically.

The device D comprises a backframe 1 with two outer flanks such as 2 intended to be fastened one to each side of the chassis of the tractor. The flank 2 has a downward extension 3. The backframe 1 is equipped, at its bottom, with a pair of arms 4 which is articulated on a transverse shaft 5 borne by the backframe. The backframe 1 also comprises a top link for fitting the central third hitching point.

Lifting means R are provided between the backframe 1 and the pair of arms 4. These means R advantageously comprise, on each side, a ram 6 directed more or less vertically, with a ball-jointed end at the top 7 of the backframe, and of which the rod 8, directed downward, is fitted with a yoke articulated to a spindle 9 borne by the pair of arms 4.

Two forearms 10a, 10b are mounted one on each side of the pair of arms 4, laterally on the outside of this pair of arms. Each forearm is mounted on an articulation spindle 11 advantageously fixed on the inner face of the forearm. This spindle 11 is borne by a bearing 12 provided on the pair of arms.

Each forearm has an attachment bracket 13 at an end distant from the pair of arms 4, for hitching an implement to two lateral bottom points. Means (not depicted) are also provided for connecting a third, top point, of the implement to a central top point 14 of the backframe.

At the opposite end to the attachment bracket 13, each forearm has an extension 15 beyond the articulation spindle 11, which extension is, at the pair of arms 4 end, on the outside. The forearm 10a, 10b is of one piece with its extension.

The opposite end of the extension 15 to the bracket 13 has a noncircular recess 16, particularly an oval one, opening between two projections 17, 18, in the direction away from the bracket 13. The projections 17, 18 have the shape of noses defining, between them, a space or passage 19, the width l of which is less than the length H of the long dimension of the recess 16, which length is measured in a direction more or less orthogonal to the mean longitudinal direction of the forearm 10a, 10b.

A transverse spindle 20, that is to say one directed parallel to the articulation spindle 11 of each forearm, is engaged in a housing 21 (FIG. 4) of the pair of arms 4. This housing 21 consists, in the example considered, of a set of two coaxial bores of the same diameter (to within the manufacturing tolerances) as the transverse spindle 20, these bores being made respectively in two parallel members 4a of the pair of arms 4.

The length H of the long dimension of the recess 16 exceeds the diameter of the spindle 20 formed of a cylindrical bar which means that there is a substantial amount of clearance j (FIG. 1) between the spindle or bar 20 and the recess 16 in a direction more or less orthogonal to the longitudinal direction of the forearm. This forearm 10a or 10b can thus oscillate, within a limited range, relative to the pair of arms 4. The amount of clearance j is determined to suit the amount of angular movement desired for this range.

The spindle 20 is equipped, over part of its length and of its periphery, with a radial bulge E which lies outside the housing 21.

The bulge E advantageously consists of a part 22 attached, particularly by welding, to the transverse spindle 20 which is formed of the cylindrical bar.

The part 22 may consist of two lengths of round stock 22a, 22b, that is to say two lengths of cylindrical steel barstock of smaller diameter than the spindle or bar 20. The lengths of round stock 22a, 22b are placed with their geometric axis parallel to that of the bar 20 tangentially against the bar 20 and tangentially to each other.

The distance l separating the projections 17, 18 exceeds the peripheral dimension m of the lengths of round stock 22a, 22b.

Figure 4:
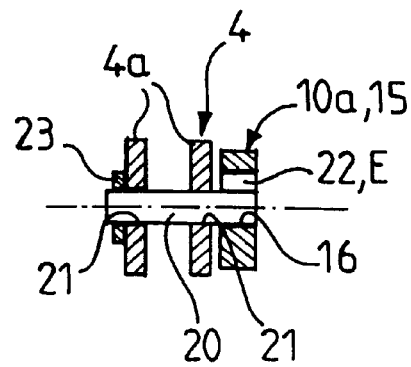
FIG. 4 is a section on the line IV—IV of FIG. 2.

The bar 20, as can be seen in FIG. 4, is held axially in its housing 21 on the one side by the bulge 22 which comes into abutment against a region of the pair of arms 4 and, on the other side, by a pin 23 engaged in a diametral hole in the bar 20. The latter can rotate freely in the bore 21.

To extract the bar 20 from its housing 21, all that is required is for the pin 23 to be removed and for the bar 20 to be shifted axially outward.

The relative dimensions of the bulge E, of the recess 16 and of the space 19 are determined such that the bulge E, when between the projections 17, 18 (FIG. 1), cannot enter the recess 16 by the rotation of the bar 20 about its geometric axis.

The amount by which the bulge E projects radially from the periphery of the bar 20 is more or less equal to the clearance j.

Figure 3:
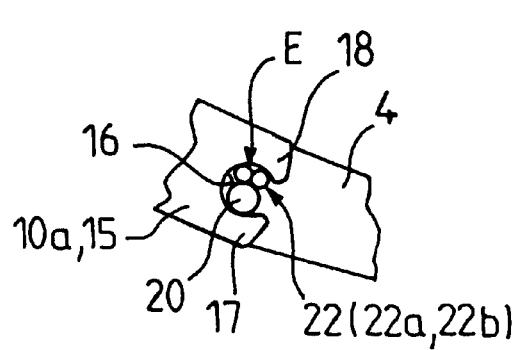
FIG. 3 is a detail of FIG. 1 illustrating the position in which the forearm is immobilized relative to the pair of arms.

This being the case, when the bulge E is housed in the recess 16, the edge of this recess is in contact, or almost in contact, with two opposed regions of the bar 20 and of the bulge E, as illustrated in FIG. 3, which means that the forearm 10a, 10b is immobilized relative to the pair of arms 4.

If the angular position of the bar 20 is rotated through about 90°, so that the bulge E is in the space 19 (FIG. 1), then a limited angular excursion of the forearm 10a, 10b relative to the pair of arms 4 is possible.

Figure 5:
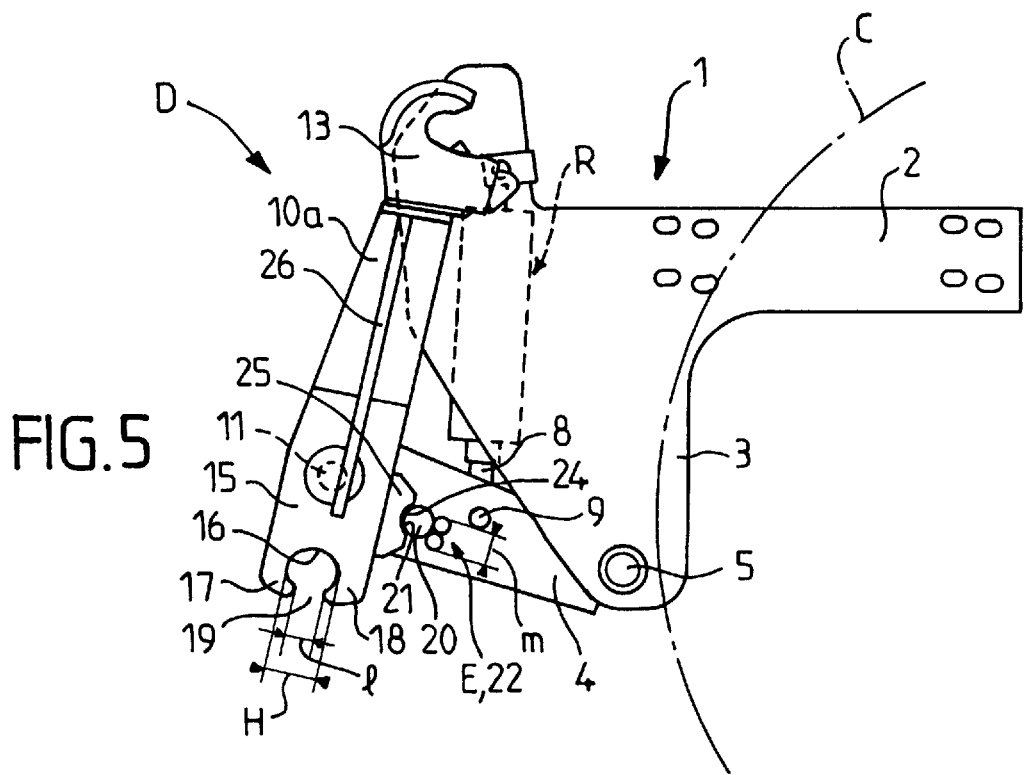
FIG. 5 shows an elevation of the lifting device when the forearm is in the folded position.

Each forearm has on its upper edge a concave part 24 capable of mating with a region of the transverse bar 20 when the forearm 10a, 10b is placed in the folded position, as illustrated in FIG. 5, the forearm being more or less vertical with the bracket 13 at the top end.

The forearm is kept in this folded position by the interaction between the concave part 24 and the bar 20. Advantageously, the concave part 24 has a profile in the shape of an arc of a circle of the same radius (to within the manufacturing tolerances) as the cylindrical part of the bar 20 and which fits into this part 24. The support thus provided against the bar 20 is precise and prevents the forearm 10a, 10b from oscillating as a result of the shaking when the tractor is in motion.

As an alternative, it would be possible to provide a concave part 24 designed to interact with the bulge E of the spindle 20, but the support provided would not be as precise.

The concave part 24 is advantageously provided on a half-moon-shaped part 25 attached, particularly by welding, to the upper edge of the forearm. This attached part 25 consists, for example, of a small plate standing on edge, welded to the forearm in the desired position.

In another alternative, a concave region could be provided on the bar 20, while the part of the arm interacting with this region would be convex.

The way in which the lifting device operates and is used stems from the foregoing explanations.

When the bulge E of the forearm 10a, 10b is inserted in the recess 16, as illustrated in FIG. 3, the forearm 10a, 10b is locked relative to the pair of arms 4.

Starting from this position it is possible, by disengaging the pin 23 (FIG. 4), to remove the bar 20 from its bore 21 and rotate it through about 90° with respect to the position of FIG. 3, then to re-engage the bar 20 into the bore 21, inserting the bulge E into the space 19 between the noses 17, 18.

The forearm 10a, 10b can therefore oscillate freely relative to the pair of arms 4, within an angular range defined by the clearance j (FIG. 1) between the edge of the recess 16 and the bar 20.

The shear strength of the bar 20 is identical in both modes of operation described above.

Just one hole corresponding to the bore 21, on each side of the lower pair of arms 4, is associated with just one recess 16 on each forearm in order to fulfill the functions of allowing locking and allowing floating.

When the lifting device is not in use for hitching an implement to the front of the tractor, the overhang can be reduced by folding the forearms 10a, 10b back as illustrated in FIG. 5.

To do this, starting from the position of FIG. 1 or of FIG. 3, the transverse bar 20 on each side is withdrawn, once the locking pin 23 has been removed.

The forearm 10a, 10b is folded upward by rotation about the spindle 11 borne by the pair of arms 4, until the concave part 24 of the half-moon-shaped part 25 comes into line with a part of the outline of the bore 21. The bar 20 is re-inserted into the bore 21, the bulge E being on the opposite side to the part 25; a region of the cylindrical surface of the bar 20 falls within and interacts with the concave part 24. When the bar 20 is fully engaged in the bore 21, the pin 23 can be refitted (FIG. 4).

The forearm 10a, 10b is therefore held in the folded position.

The arm is thus held in the folded position at low cost, without the need for a very accurate fit.

This function is preferably fulfilled at the same time as the one due to the bulge E but it is obvious that keeping the arm in this raised position by the interaction of the part 24 and of the bar 20 presents some attraction even if the bar 20 does not have the bulge E.

It is possible to vary the position in which the forearm 10a, 10b is held folded, if necessary, merely by changing the position of the half-moon-shaped part 25 on each forearm. Each side of the lower pair of arms 4 may be connected in order to provide it with torsional rigidity at low cost.

In the embodiment of FIGS. 1 to 5, it is possible:

to strengthen the forearms, particularly using webs 26, to give them strength in thrust without having to widen the region that would interfere with the tractor wheels;

to close each front end of the lower pair of arms and carry out strengthening in order to provide good rigidity;

to fit bearings 12 with copper bushes with no risk of the forearm articulation spindle 11 becoming jammed by virtue of bearing surfaces of sufficient width and diameter. This results in greater strength and improved stability.

Figure 6:
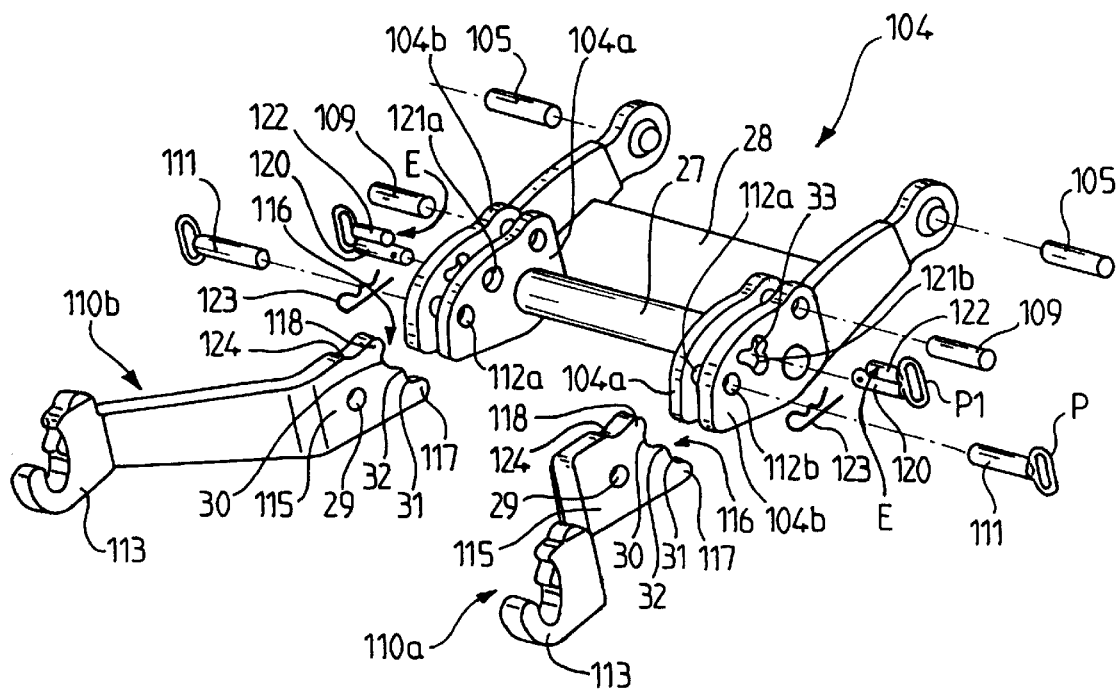
FIG. 6 is an exploded perspective view of an alternative embodiment in which just the forearms and the pair of arms are depicted.

FIG. 6 illustrates an alternative embodiment. Elements which are similar or fulfill similar roles to elements described earlier are denoted by the numerical references equal to the sum of the number 100 and the previous numerical reference; they are not described again or are described only briefly.

The pair of arms 104 has, on each side, towards the front, two parallel vertical cheeks 104a, 104b delimiting between them a space for accommodating the rear part 115 of a forearm. The part 115 is placed on the outside of the inner cheek 104a, against the outer cheek 104b which extends backward as far as its articulation to a spindle 105 provided on each side and supported by the backframe (not depicted).

A transverse tube 27, which serves to stiffen the pair of arms 104, extends between the pair of cheeks 104a, 104b situated to the right, and the pair of cheeks 104a, 104b situated to the left. The tube 27 passes through holes made in the cheeks 104a and 104b. The tube 27 is assembled rigidly with the cheeks 104a, 104b by welding. The pair of arms 104 also comprises a rigid plate 28 welded, on each side, to the rear extension of the cheeks 104b.

Each rear part 115 has a circular hole 29 through which the articulation spindle 111 supported in two circular holes 112a, 112b made one in each of the cheeks 104b, 104a, respectively, is intended to pass.

At its outer end, the spindle 111 has a handle P.

The noncircular recess 116, made at the rear of each forearm, is open wide towards the back and is bounded by two rearward projections 117, 118 in the form of lugs. The wall of the recess 116 has two rear-facing concave regions 30, 31 separated by a lump 32.

The bulge E of the transverse spindle 120 is formed of just one length of round stock 122 parallel to the spindle 120 and welded tangentially along a generatrix. The length of the spindle 120 exceeds that of the length of round stock 122, so that the inner end of the spindle 120 extends beyond the end of the length of round stock 122 over a distance that exceeds the thickness of the cheek 104a. The inner end of the spindle 120 can thus be engaged in a hole 121a in the inner cheek 104a, of the same diameter, to within the tolerance required for sliding, as the spindle 120. The limit on the engagement of the spindle 120 into the hole 121a is obtained when the inner end of the length of round stock 122 comes into abutment against the cheek 104a. The outer end of the spindle 120 has a handle P1.

The outer cheek 104b has a circular hole 121b coaxial with the hole 121a and of the same diameter for the passage of the spindle 120. The holes 121a and 121b form the housing 121 of the spindle 120.

Figure 7:
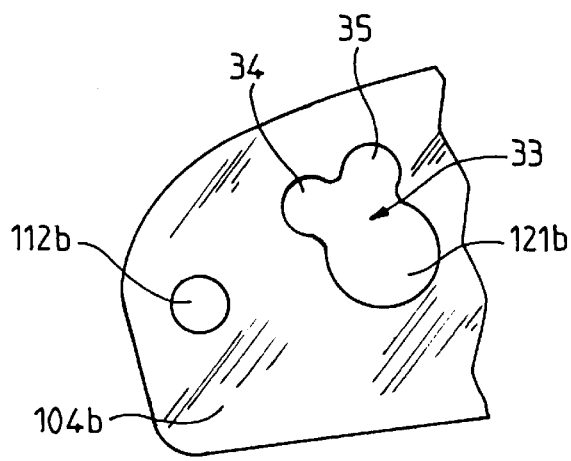
FIG. 7 shows, in elevation, to a larger scale, a detail of FIG. 6.

An opening 33, which has two lobes formed of cutouts 34, 35 (see FIG. 7), is also made in the outer cheek 104b, above the hole 121b. The opening 33 communicates with the hole 121b and has, facing forward, a first more or less semicircular cutout 34 and, facing backward, a second cutout 35 which is also more or less semicircular. The centers of the two cutouts 34, 35 are angularly offset relative to the center of the hole 121b.

The width of the cutouts 34, 35 is just enough to accommodate the length of round stock 122.

The spindle 120 may be engaged in the holes 121b and 121a in a first orientation such that the length of round stock 122 enters the cutout 34, and in a second orientation such that the length of round stock 122 enters the cutout 35.

The cutout 34 is positioned in such a way that when the length of round stock 122 is engaged therein (the forearm 110a, 110b being mounted on the spindle 111 borne by the pair of arms 104), the lug 118 is in abutment against the length of round stock 122, while the lug 117 is in abutment under the spindle 120. The forearm 110a is then immobilized, fixed, relative to the pair of arms 104.

The length of round stock 122 when engaged in the cutout 35 is outside the recess 116. The forearm 110a can therefore float within an angular range whose limits are determined by the lug 117 or 118 coming into abutment against the spindle 120.

The forearm 110a can be brought into the folded-up position by removing the spindle 120 and the length of round stock 122 from their housing, rotating the forearm 110a upward about the spindle 111. To immobilize the forearm in the folded position, the spindle 120 is re-inserted into the holes 121b and 121a in the orientation which places the length of round stock 122 in the cutout 34. The region 124 of the forearm is then in abutment against the spindle 120, which keeps the arm in the folded position.

Whichever embodiment is adopted, the fact that the forearms are positioned laterally beside the pair of arms makes it possible to obtain:

a wide central opening, to allow the fitting of a front power takeoff unit which is large enough to be reliable;

free rotation of the forearm without the risk of interference, including when it is in the folded position;

a reduced offsetting of the forearms between the narrowest possible width of the lower pair of arms 4, 104 and the position of the attachment hooks defined by standards.

I claim:

1. A front lifting device for an agricultural tractor, allowing an implement to be hitched up at two lateral bottom points and a central top point, comprising:

a backframe intended to be fixed to a chassis of the tractor and equipped at its bottom with a pair of arms which is articulated to the backframe;

lifting means provided between the pair of arms and the backframe;

two forearms, one mounted on each side of the pair of arms on an articulation spindle borne by the pair of arms, each forearm comprising an attachment bracket at a first end distant from the pair of arms and, at an opposite second end to the attachment bracket, an extension beyond the articulation spindle, said extension coming to bear, in a working position, against a stop connected to the pair of arms, each forearm structured and arranged to be folded relative to the pair of arms when the device is not in use and is in a folded position;

wherein:

an end of the extension of each forearm away from the attachment bracket comprises a recess which is open in a direction away from the attachment bracket;

the stop connected to the pair of arms comprises a transverse spindle engaged in a housing in the pair of arms, said transverse spindle being equipped, over part of its length and of its periphery, with a radial bulge consisting of at least one part attached to the transverse spindle which is a cylindrical bar;

whereby when the bulge is housed in the recess, the edge of this recess is substantially in contact with the bulge and a region opposite of the transverse spindle so that each forearm is immobilized relative to the pair of arms, whereas in an angular position in which the bulge is out of the recess, a limited angular excursion of each forearm relative to the pair of arms is possible, due to a clearance between the transverse spindle and an outline of the recess.

2. The lifting device according to claim 1, wherein the recess opens between two projections which are separated by a distance that exceeds the size of the bulge.

3. The lifting device according to claim 2, wherein the bulge, the recess and the space between the projections have relative dimensions which are determined so that the bulge remains in the space between the projections when placed there, despite any possible oscillation of the forearm relative to the pair of arms.

4. The lifting device according to claim 1, wherein the recess has a noncircular shape with a length transverse to a longitudinal direction of the forearm.

5. The lifting device according to claim 1, wherein said at least one part is attached to the transverse spindle by welding.

6. The lifting device according to claim 5, wherein said at least one attached part consists of at least one length of round stock of axis parallel to that of the bar, placed tangentially against the bar.

7. The lifting device according to claim 6, wherein the at least one attached part consists of several lengths of round stock tangential to each other.

8. The lifting device according to claim 7, wherein said at least one attached part consists of two lengths of round stock tangential to each other.

9. The lifting device according to claim 1, wherein the pair of arms comprises, on each side, an inner cheek and an outer cheek delimiting between them a space for accommodating a rear part of a forearm, an articulation spindle passing through a hole made in said rear part, said articulation spindle being supported by two holes made respectively in the cheeks, the outer cheek having an opening opening into a hole of the housing for the transverse spindle, the opening being made up of a first cutout directed forward, and of a second cutout directed backward, each cutout being capable of accommodating the bulge in order to determine the positions in which the forearm is fixed and floating, respectively.

10. The lifting device according to claim 1, wherein the forearm has on its upper edge a first part capable of mating with a region of the transverse spindle when the forearm is in the folded position, so as to keep the forearm in said folded position.

11. The lifting device according to claim 10, wherein the first part is provided in a second part which is attached to the forearm.

12. The lifting device according to claim 11, wherein the second part is attached to the forearm by welding.

13. The lifting device according to claim 10, wherein the first part of the forearm capable of interacting with the transverse spindle is concave.

14. A front lifting device for an agricultural tractor, allowing an implement to be hitched up at two lateral bottom points and a central top point, comprising:
- a backframe intended to be fixed to a chassis of the tractor and equipped at its bottom with a part of arms which is articulated to the backframe;
- lifting means provided between the pair of arms and the backframe;
- two forearms, one mounted on each side of the pair of arms on an articulation spindle borne by the pair of arms, each forearm comprising an attachment bracket at a first end distant from the pair of arms and, at an opposite second end to the attachment bracket, an extension beyond the articulation spindle, said extension coming to bear, in a working position, against a stop connected to the pair of arms, each forearm structured and arranged to be folded relative to the pair of arms when the device is not in use and is in a folded position;

wherein:
- an end of the extension of each forearm away from the attachment bracket comprises a recess which is open in a direction away from the attachment bracket;
- the stop connected to the pair of arms comprises a transverse spindle engaged in a housing in the pair of arms, said transverse spindle being equipped, over part of its length and of its periphery, with a radial bulge;
- the transverse spindle being structured and configured to have two angular positions in its housing, wherein
- in a first angular position of the transverse spindle, the bulge is housed in the recess and the forearm is immobilized relative to the pair of arms;
- while in a second angular position of the transverse spindle, the bulge is out of the recess and a limited angular excursion of the forearm relative to the pair of arms is possible.

15. The lifting device according to claim 14, wherein the recess opens between two projections which are separated by a distance that exceeds the size of the bulge.

16. The lifting device according to claim 15, wherein the bulge, the recess and the space between the projections have relative dimensions which are determined so that the bulge remains in the space between the projections when placed there, despite any possible oscillation of the forearm relative to the pair of arms.

17. The lifting device according to claim 14, wherein the pair of arms comprises, on each side, an inner cheek and an outer cheek delimiting between them a space for accommodating a rear part of a forearm, an articulation spindle passing through a hole made in said rear part, said articulation spindle being supported by two holes made respectively in the cheeks, the outer cheek having an opening opening into a hole of the housing for the transverse spindle, the opening being made up of a first cutout directed forward, and of a second cutout directed backward, each cutout being capable of accommodating the bulge in order to determine the positions in which the forearm is fixed and floating, respectively.

18. The lifting device according to claim 14, wherein the forearm has on its upper edge a first part capable of mating with a region of the transverse spindle when the forearm is in the folded position, so as to keep the forearm in said folded position.

19. The lifting device according to claim 18, wherein the first part is provided in a second part which is attached to the forearm.

20. The lifting device according to claim 18, wherein the first part of the forearm capable of interacting with the transverse spindle is concave.

* * * * *